United States Patent [19]

Emmons et al.

[11] Patent Number: 5,273,486
[45] Date of Patent: Dec. 28, 1993

[54] ADAPTIVE AIRCRAFT CABIN PRESSURE CONTROL SYSTEM

[75] Inventors: F. Richard Emmons, West Hartford; Thomas W. Donahue, Rocky Hill, both of Conn.

[73] Assignee: United Technologies Corporation, Hartford, Conn.

[21] Appl. No.: 982,555

[22] Filed: Nov. 27, 1992

[51] Int. Cl.⁵ ............................................. B64D 13/00
[52] U.S. Cl. .................................. 454/74; 244/118.5; 236/78 D
[58] Field of Search ................ 454/74; 244/118.5; 236/78 D

[56] References Cited

U.S. PATENT DOCUMENTS

| | | | |
|---|---|---|---|
| Re. 23,536 | 8/1952 | Del Mar | 454/74 |
| 2,428,283 | 9/1947 | Kemper | 454/74 |
| 2,435,819 | 2/1948 | Crever et al. | 454/74 |
| 2,447,918 | 8/1948 | Teague, Jr. | 454/74 |
| 2,549,672 | 4/1951 | Del Mar | 454/74 |
| 2,578,539 | 12/1951 | Green | 454/74 |
| 2,734,442 | 2/1956 | Jensen | 454/74 |
| 2,767,636 | 10/1956 | Fischer et al. | 454/74 |
| 2,983,211 | 5/1961 | Andresen, Jr. | 454/71 |
| 3,141,399 | 7/1964 | Andresen, Jr. | 454/74 |
| 3,461,790 | 8/1969 | Kinsell et al. | 454/74 |
| 3,473,460 | 10/1969 | Emmons | 454/74 |
| 3,577,902 | 5/1971 | Gardner | 454/74 |
| 4,553,474 | 11/1985 | Wong et al. | 454/74 |

*Primary Examiner*—William E. Wayner
*Attorney, Agent, or Firm*—Richard H. Kosakowski

[57] ABSTRACT

An adaptive aircraft cabin pressure control system is disclosed that customizes basic ascent and descent schedules to accommodate variable requirements of specific airlines, the airlines' route structures, and regional air traffic control standards. The system includes an adaptive control logic that identifies a plurality of points generated by the schedules that define ascent and descent curves corresponding to anticipated cabin pressure change rates during ascent and descent. During aircraft flight, the logic samples and stores actual cabin pressure change rates at each of the plurality of points. After the flight, the actual cabin pressure change rates are averaged and the average rate is compared to the anticipated cabin pressure change rate at each point. An offset is then calculated representing the difference between the average actual rate and an anticipated rate, and the ascent and/or descent schedules are adapted by the offset to bring the anticipated cabin pressure change rates closer to the average actual rate. After several flights, the ascent and descent schedules are customized by the adaptive control logic to a particular airline's requirements.

12 Claims, 4 Drawing Sheets

ADAPTIVE AIRCRAFT CABIN PRESSURE CONTROL SYSTEM

BACKGROUND OF THE INVENTION

The present invention relates to an aircraft cabin pressure control system for controlling aircraft cabin pressure during aircraft ascent, cruise and descent. In particular, a system is disclosed for adapting control of rates of cabin pressure changes to meet variable requirements of particular airlines, the airlines' specific route structures, and regional air traffic control standards.

Air pressure within an aircraft cabin is controlled during an entire flight profile to minimize passenger discomfort, and ensure a maximum pressure differential between the cabin and ambient pressures is not exceeded. In a typical flight from a coastal or sea-level city to a landing site slightly above sea level, at takeoff, pressure within the aircraft cabin ($P_c$) and actual ambient pressure ($P_a$) outside of the cabin are approximately the same, 14.70 pounds per square inch ("p.s.i."). The aircraft takes off and ascends to an altitude of 45,000 feet, for example, where $P_a$ decreases to approximately 2.14 p.s.i. Then, the aircraft cruises for a specific time at that altitude, until it descends to the landing site, which has an ambient pressure ($P_{ld}$) slightly lower than the $P_a$ at take off. During such a flight, the cabin pressure decreases during the ascent so that a minimum human comfort pressure of approximately 10.92 p.s.i. (equivalent to an altitude of approximately 8,000 feet) is not exceeded, and the maximum differential between $P_a$ and $P_c$ is not exceeded, as well. During descent, $P_c$ increases so that it is approximately the same as the $P_{ld}$ slightly before the aircraft lands. That ensures $P_c$ is at a slightly higher pressure than $P_a$ when the aircraft lands, thereby allowing the aircraft doors to be opened easier in an emergency. Maximum passenger comfort during the flight is achieved by minimizing the rate of cabin pressure change during ascent and descent, so that the rates do not exceed the equivalent of approximately 500 feet per minute ("f.p.m.") for ascent and 300 f.p.m. for descent.

Known systems for controlling aircraft cabin pressure utilize a cockpit selector panel to communicate with an electronic cabin pressure controller, which actuates an outflow valve. The cabin is pressurized by compressed bleed air directed into the cabin from the aircraft's engines. Modulation by the controller of the outflow valve controls rate of air flow out of the cabin, thereby controlling cabin pressure.

As described in U.S. Pat. No. 3,473,460 to Emmons, incorporated herein by reference, and assigned to the assignee of the present invention, an automated system for controlling the rate of aircraft cabin pressure change is disclosed that utilizes the aforesaid three parameters, $P_a$, $P_c$ and $P_{ld}$, in a function generator (FIG. 1, No. 33) having a single, non-adjustable operating line as a function of the difference between $P_a$ and $P_{ld}$ to provide a set point for the desired rate of cabin pressure change. Such a non-adjustable operating line constrains control of cabin pressure rate changes to only values along the non-adjustable operating line of the function generator. Therefore, that system could not anticipate a literally infinite number of possible cabin pressure ascent and descent profiles resulting from geography, weather, air traffic control, etc.

An improved system for controlling the rates of aircraft cabin pressure change is disclosed in U.S. Pat. No. 5,186,681, filed on Sep. 30, 1991, incorporated herein by reference, and assigned to the assignee of the present invention. It discloses a method for generating a variable desired rate of cabin pressure change that utilizes schedules stored in the controller that incorporate specific rate limit set points, or that include non-linear functions correlating cabin pressure to ambient pressure or ambient pressure rates of change. The schedules are typically supplied by aircraft manufacturers, and attempt to typify a range of aircraft flight profiles.

Such schedules, however, have been unable to accommodate varying demands of a world-wide airline market. Typically, North American, European and Asian airlines utilize significantly different flight profiles. For example, an European airline having numerous flights between France and Italy would utilize much more rapid ascents and descents than an airline flying primarily up and down the East Coast of North America. Additionally, Asian operators frequently have unique cruise schedules, which impact rates of ascent and descent. Finally, regional air traffic control requirements (e.g., duration and frequency of holding patterns) likewise impact unique characteristics to an airline's typical flight profiles, rendering fixed, rate-limit or non-linear control schedules in need of custom adaptation for specific usage.

Accordingly, it is the general object of the present invention to provide an adaptive aircraft cabin pressure control system that overcomes the deficiencies of the prior art.

It is a more specific object to provide an adaptive aircraft cabin pressure control system that accommodates specific requirements of all airlines.

It is another specific object to provide an adaptive aircraft cabin pressure control system that can be implemented in existing aircraft cabin pressure control systems.

It is yet another object to provide an adaptive aircraft cabin pressure control system that automatically adapts existing schedules for controlling aircraft cabin pressure to requirements of a specific flight profile.

The above and other objects and advantages of this invention will become more readily apparent when the following description is read in conjunction with the accompanying drawings.

SUMMARY OF THE INVENTION

An adaptive aircraft cabin pressure control system is disclosed for controlling aircraft cabin pressure during an entire flight profile including ascent, cruise and descent. The control system is utilized to minimize passenger discomfort, and to ensure a maximum pressure differential between the cabin and ambient pressure is not exceeded.

In the preferred embodiment, the invention comprises a selector panel in the cockpit of the aircraft that enables the aircraft operator to input specific planned flight data and to select commands for controlling cabin pressure; an electronic cabin pressure controller that receives the flight data and executes the commands from the selector panel, thereby producing cabin pressure control signals; an outflow valve that receives the signals from the controller and, in response to the signals, modulates flow of pressurized air out of the aircraft cabin, thereby controlling cabin pressure; ascent and descent schedules stored in the controller for maintaining the desired cabin pressure rates based upon receipt of signals from the aircraft's sensors and avionics identifying cabin pressure ($P_c$), external ambient pressure ($P_a$), ambient pressure at cruise altitude ($P_{cr}$), cabin pressure at cruise altitude ($P_{cc}$), and ambient pressure at a landing sight ($P_{ld}$); and an adaptive control logic stored in the controller that samples actual cabin pressure rates during a flight and adapts the schedules based upon variations between the actual rates and the rates anticipated by the schedules.

In use, prior to a flight, the schedules are loaded into memory components of the controller. The selector panel transmits signals identifying the $P_{cr}$, $P_{cc}$ and $P_{ld}$ to the controller as part of the planned flight data. Additionally, the controller monitors the $P_c$ and $P_a$ via signals from the aircraft's sensors. The schedules include logic executed by a microprocessor in the controller, in response to the signals, to control rates of change of the cabin pressure.

During the ascent and descent, the adaptive control logic samples and stores actual cabin rates of change at a plurality of intervals corresponding to specific points in the ascent and descent schedules. After the flight, the stored rates are averaged and compared to rates anticipated by the schedules. The schedules are then automatically adjusted by slightly moving the points in the schedules in response to the adaptive control. Consequently, after several flights, the schedules become adapted to specific aircraft operating conditions.

DETAILED DESCRIPTION OF THE PREFERRED EMBODIMENTS

Figure 1:
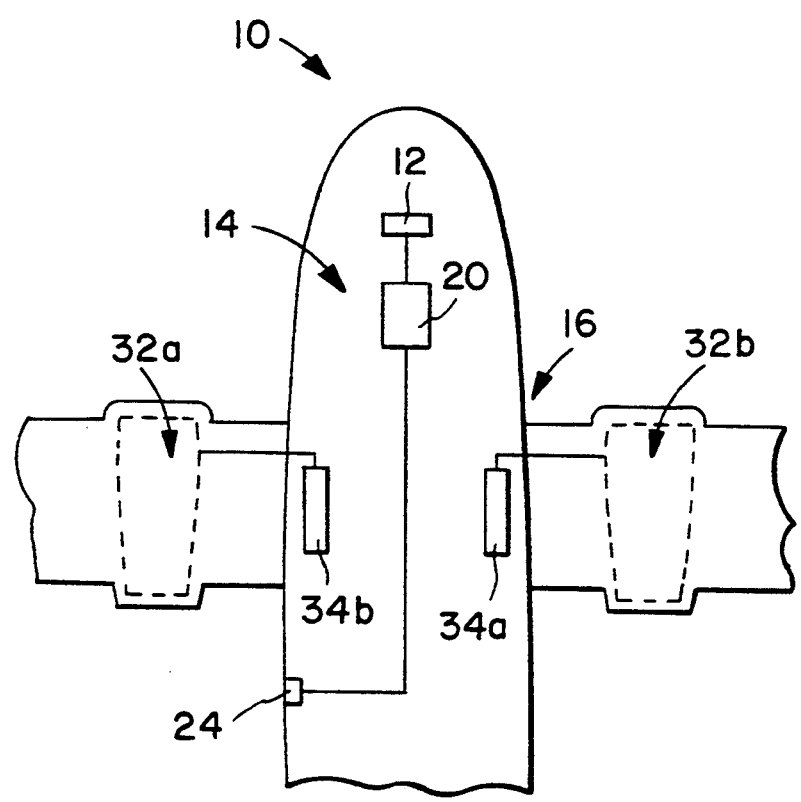
FIG. 1 is a schematic representation of the adaptive aircraft cabin pressure control system of the present invention.

Referring to the drawings in detail, the preferred embodiment of an adaptive aircraft cabin pressure control system of the present invention is shown and generally designated by the numeral 10. The invention basically comprises a selector panel 12 within a cockpit 14 of an aircraft 16 that enables an operator (not shown) to transmit planned flight data and to select commands for controlling air pressure within the aircraft's cabin 18; an electronic cabin pressure controller 20 (hereinafter "controller") within the aircraft 16 that receives signals from the aircraft's sensors and avionics 22 and commands from the selector panel 12 and produces output command signals; a variable flow outflow valve 24 that receives the output command signals from the controller 20 and modulates flow of pressurized cabin air out of the cabin 18 in response to the signals, thereby controlling cabin pressure; ascent and descent schedules 26 and 28 stored in the controller 20 for maintaining desired cabin pressure change rates; and an adaptive control means or logic stored in the controller 20 that samples and stores actual cabin pressure rates during a flight and adapts the schedules 26, 28 based upon variations between the actual rates and rates anticipated by the schedules.

As best shown schematically in FIG. 1, compressed bleed air is directed from the aircraft's engines 32a, 32b through air conditioners 34a, 34b and into the cabin 18, to pressurize the cabin air, as is generally known in the art. The pressurized air exits the cabin 18 through the variable flow outflow valve 24 at a rate determined by the controller 20, thereby controlling air pressure within the cabin 18.

Figure 2:
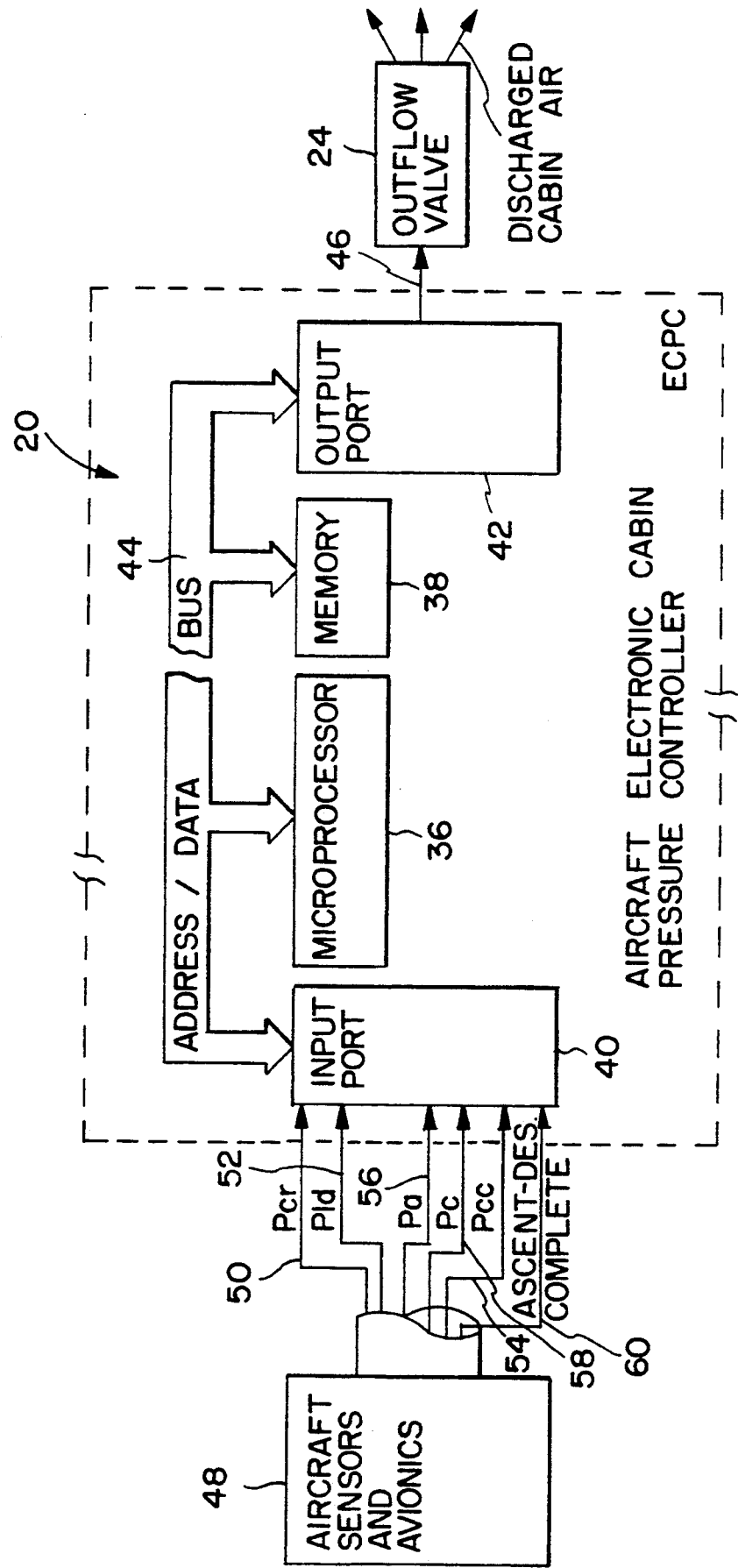
FIG. 2 is a functional block diagram of an aircraft electronic cabin pressure controller utilized in the present invention.

As seen in FIG. 2, the controller 20 includes a microprocessor 36 (such as INTEL®, Model No. 80486, manufactured by Intel Corporation, of Santa Clara, Calif., or MOTOROLA®, Model No. 68020, manufactured by Motorola, Inc., of Schaumberg, Ill.); a standard memory 38 (including known elements such as RAM, PROM and EEPROM components); input/output ports 40, 42, which include standard analog-to-digital and digital-to-analog convertors; and, a standard address/data bus 44. The output command signals generated by the controller 20 travel on line 46 to the outflow valve 24. An example of such a valve is disclosed in U.S. Pat. No. 3,740,006 to Maher, and assigned to the assignee of the present invention.

As also shown in FIG. 2, a plurality of variables are sent to the controller 20, in the form of signals, from standard known aircraft avionics and sensors 22. Throughout this disclosure, the variables will be continuously identified. To facilitate disclosure, the variables are listed and identified below in the following chart:

| VARIABLE | EXPLANATION |
| --- | --- |
| $P_a$* | External aircraft ambient pressure |
| $P_c$* | Cabin pressure |
| $P_{cr}$* | Ambient pressure at cruise altitude |
| $P_{cc}$* | Cabin pressure at cruise altitude |
| $P_{cd}$* | Desired cabin pressure |
| $P_{ld}$* | Ambient pressure at aircraft landing site |
| $K_1$ | Initial rate of descent |
| $K_2$ | Desired ratio of $DP_c/DP_a$ as a function of a typical $DP_a$ followed during a descent. (For purposes of this disclosure, "D" means "Delta".) |
| $P_{cs}$ | Schedule output specific to aerodynamic climb characteristics of an aircraft |
| $K_{ma}$ | Ascent multiplier equivalent to $(P_c - P_{cc})*P_{cs}$ |
| $K_{md}$ | Descent multiplier equivalent to $(DP_c/DP_a)/K_2$ |
| $P_{ci}$ | Climb pressure schedule |
| $C_1$ | Gain factor |

*It is stressed that only the asterisked variables ($P_a$, $P_c$, $P_{cr}$, $P_{cd}$ and $P_{ld}$) share common explanation or meaning with similar or identical variables in U.S. Pat. No. 5,186,681, previously incorporated herein by reference, and assigned to the assignee of the present invention. The remaining, non-asterisked variables are limited to the specific explanation or meaning recited herein, and do not share common meanings with variables in that application.

As seen in FIG. 2, the aircraft avionics and sensors 22 send to the controller signals identifying ambient pressure at cruise altitude ($P_{cr}$) on a line 50; ambient pressure at the aircraft landing site ($P_{ld}$) on a line 52; cabin pressure at cruise altitude ($P_{cc}$) on a line 54; sensed ambient pressure ($P_a$) on a line 56; sensed cabin pressure ($P_c$) on a line 58; and a signal on line 60 indicating whether the aircraft's ascent or descent is complete. These six signals may be provided over the aircraft's digital bus (e.g., ARINC 429 or 629) (not shown), if so equipped, or by dedicated electrical lines presented to the controller, or in any other appropriate manner.

Figure 3:
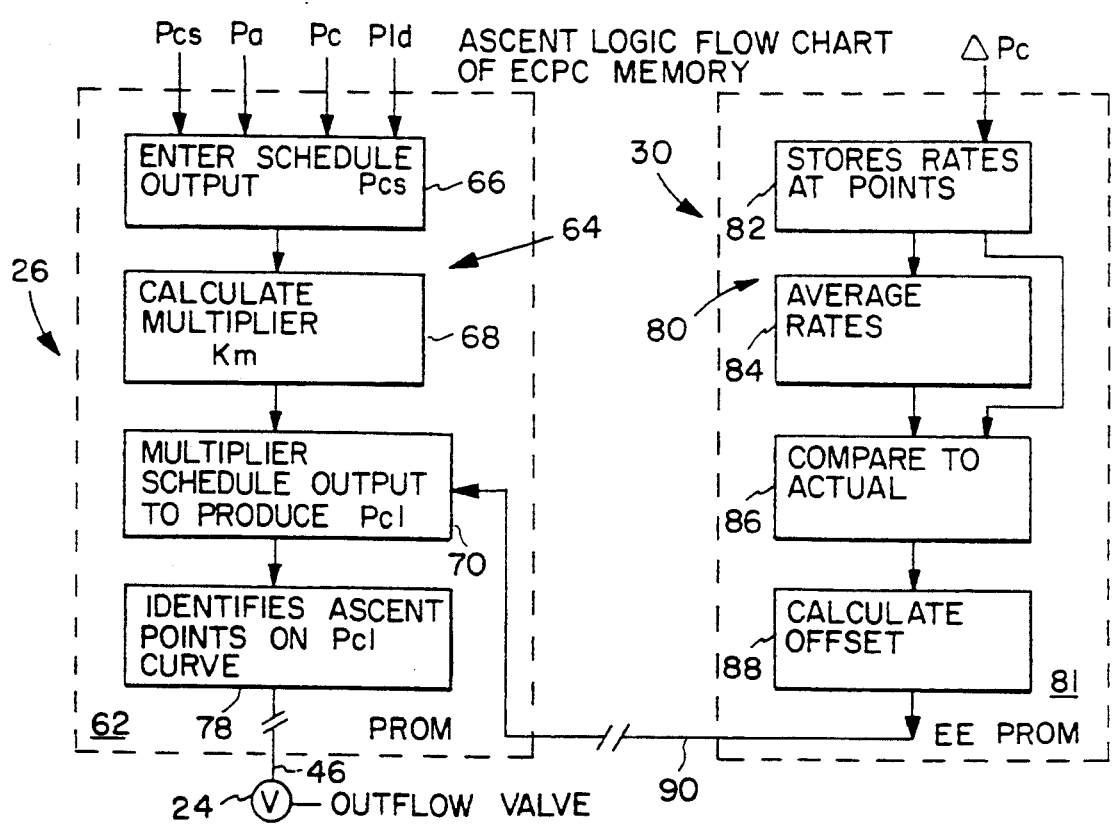
FIG. 3 is a flow chart diagram of some logical steps executed by the controller of FIG. 2.

Ascent schedule 26 stored in a PROM 62 component of the controller's memory 38 has an ascent logic 64 schematically represented in FIG. 3. In a first step 66, a schedule output $P_{cs}$ specific to aerodynamic characteristics on the aircraft 16 is entered, while the controller reads signals from the aircraft's avionics and sensors identifying ambient pressure at selected cruise altitude $P_{cr}$, actual ambient pressure $P_a$, cabin pressure $P_c$, and ambient pressure at a landing site $P_{ld}$. In a second step 68, an ascent multiplier $K_{ma}$ is calculated by the following quotation:

$$K_{ma} = (P_c - P_{cc}) * P_{cs} \qquad \text{(Eq. 1)}$$

In the third step 70, a climb pressure schedule ($P_{ci}$) is determined by the following quotation:

$$P_{ci} = P_{cc} + (K_{ma} * P_{cs}) \qquad \text{(Eq. 2)}$$

The resulting climb pressure schedule $P_{ci}$ is executed by the controller's microprocessor 36 during ascent of the aircraft 16 to control the outflow valve 24, thereby controlling cabin pressure change rate. As seen in FIG. 7, the resulting climb pressure schedule $P_{ci}$, as determined above, or as determined by alternative known methods, exhibits a variable cabin pressure rate ascent curve 72, having a shape generally designed by ascent graph 74.

By the present invention, a fourth step 76 of the ascent logic 64 identifies a plurality of ascent points 78a-h (see FIG. 7), which define the ascent curve 72. The adaptive control means 30 utilizes an adaptive ascent means or logic 80, stored in an EEPROM memory component 81 of the controller memory 38, and shown schematically in FIG. 3. In a first ascent step 82, the adaptive logic 80 reads and stores rates of change in actual cabin pressure ($DP_c$) at ascent points 78a-h, shown on ascent graph 74. In a second ascent step 84, after the aircraft's ascent is completed, the logic averages the stored rates, and then in a third ascent step 86, compares the average to the rate of cabin pressure change anticipated by the ascent schedule 26 at each point 78a-h. In a fourth ascent step 88, the logic determines if the average rate differs from the anticipated rate at each point 78a-h by more than some predetermined amount, for example, 25 feet per minute. If so, the logic calculates a specific offset to adjust the associated point. The offset is then communicated by line 90 to the third step 70 of the ascent logic 34 to adjust the climb pressure schedule ($P_{ci}$) to make the offset to the associated point in the climb pressure schedule.

The fourth ascent step 88 of the adaptive logic 80 limits calculation of offset valves to exclude variations beyond a preset range, so that abnormal aircraft ascents (e.g., maneuvering to avoid a storm) would not generate offsets. The effect of the adaptive control logic 30 after several flights is to "ratchet" the basic climb pressure schedule ($P_{ci}$) into a custom schedule that encompasses peculiarities of an airline's unique flight characteristics.

It is possible to use the above-described application of the ascent schedule 26 to control rate of cabin pressure ($P_c$) change during the descent phase of an aircraft's flight profile. However, an aircraft descent phase differs significantly from ascent because of a high probability of an aircraft being placed in a holding pattern by air traffic control, prior to landing. Standard practice therefore has been to implement a constant rate of cabin pressure change through the duration of the entire descent, including any such holding patterns, to maximize efficiency of aircraft descents by minimizing the rate of cabin pressure change. Consequently, optimal descent rates of cabin pressure change are utilized that hinge upon an initial rate of descent $K_1$. A desired rate of cabin pressure change is determined by the following equation:

$$\text{RATE} = K_1 + C_1 * (DP_c/(DP_a - K_2)) \qquad \text{(Eq. 3)}$$

where:
$K_1$ = Initial rate of descent;
$C_1$ = Gain factor;
$DP_c$ = Pressure at the landing site ($P_{ld}$)—Cabin pressure at the start of descent ($P_c$);
$DP_a$ = Pressure at the landing site ($P_{ld}$)—Ambient pressure at the start of descent ($P_a$); and
$K_2$ = The typical ratio of $DP_c/DP_a$ as a function of $DP_a$ that would be followed during the descent.

Figure 4:
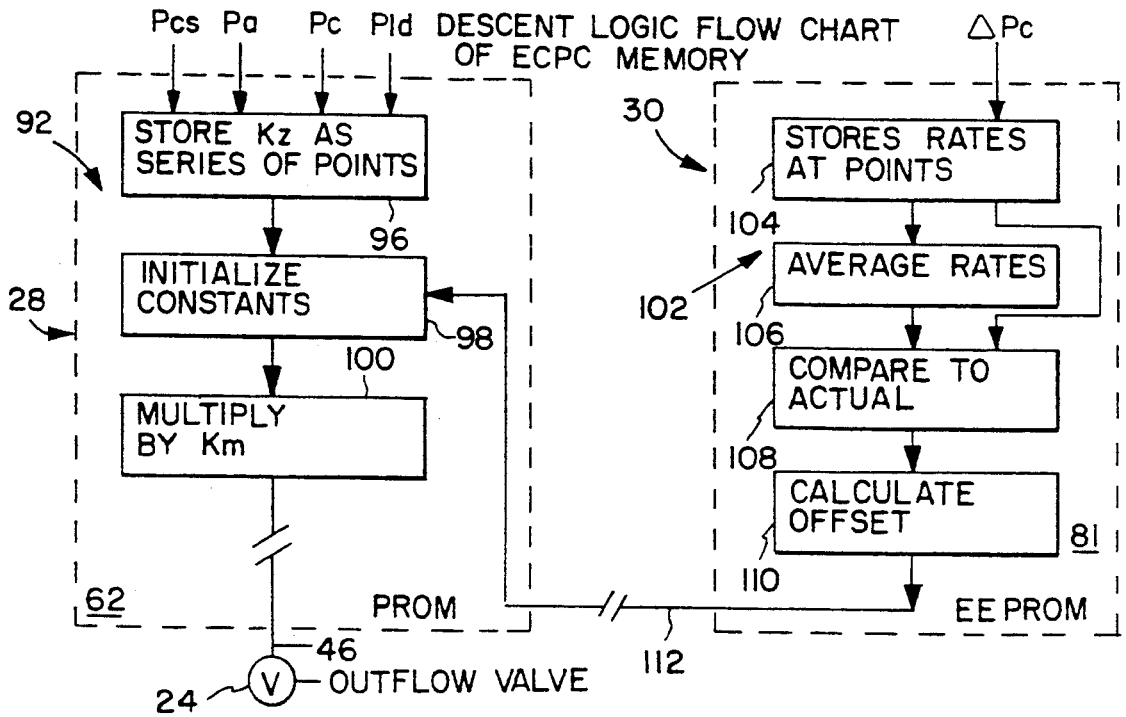
FIG. 4 is a flow chart diagram of additional logical steps executed by the controller of FIG. 2.
Figure 5:
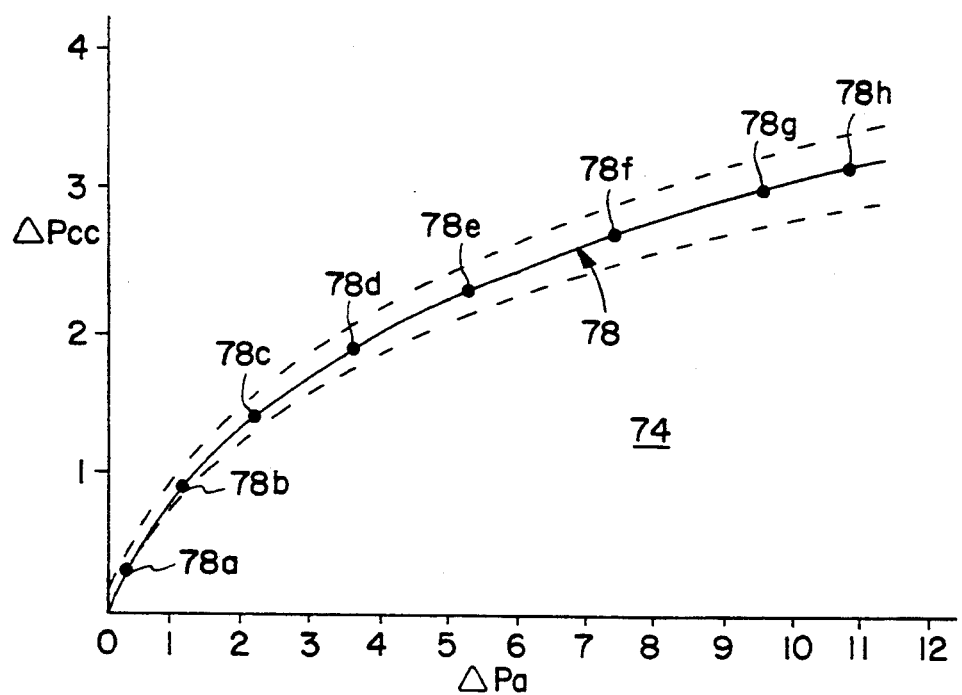
FIG. 5 is a functional diagram used in the description of the present invention; and, FIG. 6 is another functional diagram used in the description of the present invention.
Figure 6:
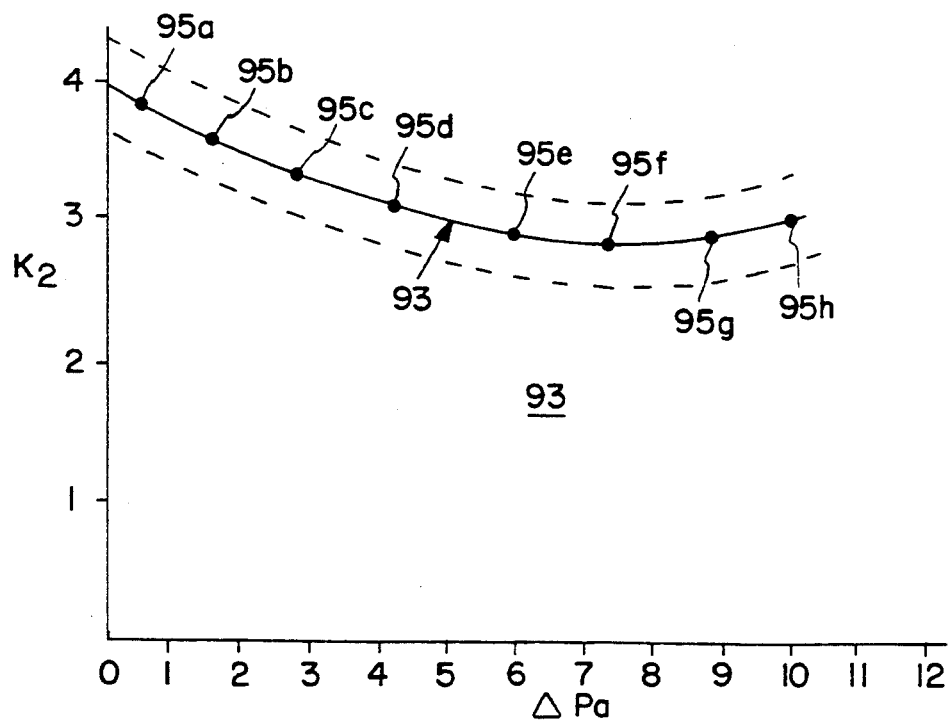

The descent schedule 28, stored in the PROM 62 component of the controller's memory 38, has a descent logic 92 schematically represented in FIG. 4. In known descent schedules, the aforesaid $K_2$ ratio of $DP_c/DP_a$ is stored as an equation that exhibits a variable cabin pressure rate descent curve 93 shown in the descent graph 94 of FIG. 8. By the present invention, $K_2$ is stored as a plurality of descent points in a first step 96 of the descent logic 92, such as the descent points 95a-h indicated in FIG. 8, which points define a descent curve 93. At the start of the descent in a second step 98 of the descent logic 92, the constants are initialized through signals identifying the cabin pressure ($P_c$), external ambient pressure ($P_a$), and the ambient pressure at the landing site ($P_{ld}$), and through determination of the descent multiplier $K_{md}$, by the following quotation:

$$K_{md} = (DP_c/DP_a)/K_2 \qquad \text{(Eq. 4)}$$

In a third step 100 of the descent logic 92, $K_2$ of the basic descent rate equation (Eq. 3) is multiplied by $K_{md}$ at the start of the descent to set the second part of the equation to zero, by setting $K_2$ at the actual ($DP_c/DP_a$), instead of its ordinary valve as the desired ($DP_c/DP_a$). The resulting rate is executed by the microprocessor 36 of the controller 20 during descent of the aircraft 16 to control outflow valve 24, thereby controlling cabin pressure change rate.

By the present invention, adaptive control logic 30 operates to adapt the descent schedule 28 in much the same manner as with the ascent logic 64. Adaptive control 30 utilizes an adaptive descent means or logic 102 stored in the EEPROM memory component 81 of the controller memory 38 and shown schematically in FIG. 4. For a first descent step 104 of the logic 102, rates of change in actual cabin pressure ($DP_c$) at descent points 95a-h are read and stored. In a second descent step 106, after the aircraft's descent is completed, the logic averages the stored rates, and then, in a third descent step 108, the logic compares the average to the rate of cabin pressure change anticipated by the descent schedule 28 at each point 95a-h. In a fourth descent step 110, the logic determines if the average rate is higher than the anticipated rates, or $K_1$. If so, the fourth step 110 determines an offset amount to move $K_1$ so it is closer to the average of the actual rate. Alternatively, if the average of the actual rate is different than $K_1$, the fourth step 110 can calculate an offset to adjust $K_2$ closer to the actual rate. The offset is then communicated by line 112 to the second step 98 of the descent logic 92 to adjust $K_1$ or $K_2$.

As with the adaptive ascent logic 80, fourth descent step 110 of the adaptive descent logic 102 limits calculation of offset values to exclude variations beyond a preset range, so that abnormal aircraft descents (e.g., extremely long holding patterns, diversions away from storms) would not generate offsets. The result is a descent rate control which adapts itself to actual descent profiles being flown by a particular airline.

It should be understood by those skilled in the art that obvious modifications in the above disclosure can be made without departing from the spirit of the invention. For example, ascent and descent logic 64, 92 of the ascent and descent schedules 26, 28 may determine optimal rates of cabin pressure ($P_c$) change in a variety of known methods. Additionally, the ascent and descent logic 64, 92, as well as the adaptive ascent and descent logic 80, 102, may be stored in a variety of memory devices known in the art. Also, the adaptive control logic 30 is susceptible of a variety of similar corrective, adaptive applications to adapt variable output functions. Accordingly, reference should be made primarily to the accompanying claims, rather than the foregoing Specification, to determine the scope of the invention.

Having thus described the invention, what is claimed is:

1. An adaptive aircraft cabin pressure control system for controlling cabin pressure change rates during a flight of an aircraft comprising:
   a. a controller that receives sensed information identifying ambient air pressure outside the aircraft ($P_a$), pressure inside the aircraft cabin ($P_c$), and information identifying pressure at a landing site ($P_{ld}$), ambient pressure at cruise altitude ($P_{cr}$) and desired cabin pressure at cruise altitude ($P_{cc}$), adapted to produce output command signals;
   b. an outflow valve that receives output command signals from the controller adapted to modulate flow of pressurized air out of the cabin to change cabin pressure;
   c. schedules stored in the controller adapted to generate anticipated cabin pressure change rates for the flight as a function of $P_a$, $P_c$, $P_{ld}$, $P_{cr}$ and $P_{cc}$ so that the controller executes the rates as output command signals; and
   d. adaptive control means stored in the controller for adapting cabin pressure change rates generated by the schedules closer to actual cabin pressure change rates experienced during the flight, comprising:
      i. means for identifying a plurality of points that define variable cabin pressure change rate curves representing the anticipated cabin pressure change rates generated by the schedules;
      ii. means for sensing and storing actual cabin pressure change rates at each of the plurality of points during the flight;
      iii. means for averaging the stored actual cabin pressure change rates;
      iv. means for comparing the average actual cabin pressure change rate to cabin pressure change rates anticipated by the schedules at each of the plurality of points;
      v. means for generating an offset for each of the plurality of points to adapt the cabin pressure change rate anticipated by the schedules at each point closer to the average actual cabin pressure change rate; and
      vi. means for adapting the cabin pressure change rate anticipated by the schedules for each of the plurality of points by the offset so that the anticipated cabin pressure change rates at each point are closer to the average actual cabin pressure change rate.

2. The system of claim 1, wherein the adaptive control means comprises adaptive control logic stored in memory components of the controller adapted to be executed by the controller.

3. The system of claim 2, wherein the adaptive control logic includes:
   a. adaptive ascent logic to adapt an ascent schedule that generates anticipated cabin pressure change rates during an ascent phase of the flight; and
   b. adaptive descent logic to adapt a descent schedule that generates anticipated cabin pressure change rates during a descent phase of the flight.

4. The system of claim 2, wherein the schedules are stored in a PROM ("programmable read only memory") memory component of the controller and the adaptive control logic is stored in an EEPROM ("electrically erasable programmable read only memory") memory component of the controller.

5. A method for controlling cabin pressure change rates during a flight of an aircraft comprising the steps of:
   a. scheduling anticipated cabin pressure change rates during the flight as a plurality of points that define variable cabin pressure change rate curves;
   b. sensing and storing actual cabin pressure change rates at each of the plurality of points during the flight;
   c. averaging the stored actual cabin pressure change rates;
   d. comparing the average actual cabin pressure change rate to the anticipated cabin pressure change rates at each of the plurality of points;
   e. generating an offset for each of the plurality of points to adapt the anticipated cabin pressure change rate at each point closer to the average actual cabin pressure change rate;
   f. adapting the anticipated cabin pressure change rate for each of the plurality of points by the offset so that the anticipated cabin pressure change rates are closer to the average actual cabin pressure change rates;
   g. producing output command signals in response to the adapted anticipated cabin pressure change rates; and
   h. modulating flow area of an outflow valve in response to the output command signals to control rates of flow of pressurized air out of the aircraft cabin.

6. The method of claim 5, wherein the step of scheduling further comprises:
   a. scheduling anticipated ascent cabin pressure change rates during the flight as a plurality ascent of points; and
   b. scheduling anticipated descent cabin pressure change rates during the flight as a plurality of descent points.

7. The method of claim 5 further comprising the steps of:
   a. storing the scheduled, anticipated cabin pressure change rates during the flight as a plurality of points in logic steps in a PROM ("programmable read only memory") memory component of an electronic cabin pressure controller; and b. storing the sensing and storing, averaging, comparing, and generating steps in logic steps in an EEPROM ("electronically erasable programmable read only memory") memory component of the controller.

8. In a variable output command signal control system characterized by schedules adapted to generate anticipated signal change rates that define variable signal change rate curves, the improvement comprising adaptive control logic, including means for identifying a plurality of points that define the anticipated variable signal change rate curves, means for sensing and storing actual signal change rates at each of the plurality of points during output of the command signals, means for averaging the stored actual signal change rates, means for comparing the average actual signal change rate to anticipated signal change rates at each of the plurality of points, means for generating an offset for each of the plurality of points to adapt the anticipated signal change rate closer to the average actual signal change rate, and means for adapting the anticipated signal change rate for each of the plurality of points by the offset so that the anticipated signal change rates for each point are closer to the average actual signal change rate.

9. The system of claim 8, wherein the adaptive control logic is stored in memory components of a controller producing the output command signals.

10. The system of claim 9, wherein the schedules are stored in a PROM ("programmable read only memory") memory component of the controller and the adaptive control logic is stored in an EEPROM ("electrically erasable programmable read only memory") memory component of the controller.

11. The system of claim 10, wherein the variable output command signals produced by the controller are received by an aircraft variable outflow valve adapted to modulate flow rate of pressurized air out of a pressurized aircraft cabin, so that the variable output command signal controls cabin pressure.

12. The system of claim 11, wherein the adaptive control logic includes:

a. adaptive ascent logic to adapt an ascent schedule that generates anticipated cabin pressure change rates during an ascent phase of an aircraft flight; and b. adaptive descent logic to adapt a descent schedule that generates anticipated cabin pressure change rates during a descent phase of the aircraft flight.

* * * * *